Dec. 31, 1963 — H. E. DE BUHR ETAL — 3,115,976

BALE HANDLING MECHANISM

Filed June 1, 1962 — 5 Sheets-Sheet 1

INVENTORS
H. E. DE BUHR
B. G. SAWYER

INVENTORS
H. E. DE BUHR
B. G. SAWYER

Dec. 31, 1963   H. E. DE BUHR ETAL   3,115,976
BALE HANDLING MECHANISM
Filed June 1, 1962   5 Sheets-Sheet 3

INVENTORS
H. E. DE BUHR
B. G. SAWYER

Dec. 31, 1963   H. E. DE BUHR ETAL   3,115,976
BALE HANDLING MECHANISM
Filed June 1, 1962   5 Sheets-Sheet 5

INVENTORS
H. E. DE BUHR
B. G. SAWYER 3,115,976
BALE HANDLING MECHANISM
Harold E. de Buhr and Bobby G. Sawyer, Ottumwa, Iowa, assignors to Deere & Company, Moline, Ill., a corporation of Delaware
Filed June 1, 1962, Ser. No. 199,427
10 Claims. (Cl. 214—83.3)

This invention relates to bale-handling mechanism or apparatus and more particularly to such mechanism as used in conjunction with the so-called pickup baler.

A popular type of conventional pickup baler is one which is drawn or otherwise propelled over a field of previously cut and windrowed hay or similar crop and which has thereon pickup mechanism adapted to pick up hay from the windrow and to move this hay in successive charges into a bale chamber in which reciprocating plunger or the like operates to compact the charges of hay into bale form, after which automatic tying mechanism, operated at predetermined intervals according to the attainment by the charges of a predetermined size, ties the charges into individual bales, each consisting of several charges. As each bale is formed, it acts as a header for subsequent charges and therefore a subsequent bale tied and completed forms the header for the following bale and so on. In most balers of the type known today, the bale chamber terminates at its rear in a bale case extension which affords a rear outlet from which the bales emerge in succession along a rearward path. If such baler is not equipped with a bale handler of any particular type adapted to deliver the emerging bales to a trailing wagon or the like, the bales are allowed to descend to the field and are subsequently picked up.

However, with the advent of the automatic bale thrower, as exemplified particularly in the patent to Morrison 2,756,865, this procedure is seldom followed. Instead, mechanism designed according to the Morrison patent is attached to or otherwise used with the baler substantially as a continuation of the bale outlet so as to receive the individual bales and to literally throw them upwardly and rearwardly into a trailing wagon. This makes the entire baling operation automatic, from the pick up to the wagon transfer and eliminates manual handling of the bales, except in certain circumstances where it is deemed more desirable to discharge the bales to the ground. In the Morrison patent, the bale thrower itself comprises a pair of arms which depend from a transverse pivot above the bale case outlet and between which the bales emerge in succession, the arms being provided at the lower ends thereof with receiver means for engaging the emerging bales. When the bale emerges to a predetermined extent, power-operated mechanism is set into action for swinging the arms upwardly and rearwardly through a predetermined angle, the arms stopping thence and returning to their starting position. As the arms decelerate and stop, the bale becomes disengaged therefrom and travels rearwardly and upwardly to the trailing wagon. This procedure is repeated as long as bales are emerging from the bale case. The power-operated mechanism is triggered by a bale-sensing member or feeler which, in the particular design illustrated in the Morrison patent, trips a clutch of the one-revolution type.

In the patent referred to, the bale-sensing member or feeler is located above the path of the emerging bales and intermediate the bale thrower arms and consequently its presence will not interfere with movement of the arms on their return stroke. However, improvements in the patent design entail the use of protective screens at opposite sides of the thrower mechanism to guard against injury to personnel in the vicinity. Such protective screens afford supporting structure, of course, at the sides of the thrower and it is found convenient to mount the bale-sensing or feeler member thereon. On the other hand, a problem occurs in that the thrower mechanism includes moving parts which must pass the feeler on the throwing stroke and which must again pass the feeler on the return stroke, the latter setting up an undesirable mechanical interference which has many disadvantages.

According to the present invention, these disadvantages are eliminated by the provision of mechanism which keeps the feeler clear of the moving parts of the throwing mechanism until the mechanism returns to its starting position. It is a feature of the invention to utilize power derived from movement of the thrower to actuate the feeler to a retracted position. A significant object of the invention resides in means for connecting the feeler to the power-operated mechanism for actuating the thrower in the first instance. In this respect, the invention features a disconnectible force-transmitting means which, when connected, permits automatic operation and which, when disconnected, permits manual or selective operation. The invention has for another object the provision of means for deliberately retracting the feeler and preventing automatic operations so that the bales may be ejected directly to the ground rather than being thrown.

The foregoing and other important objects and desirable features inherent in and encompassed by the invention will become apparent as a preferred embodiment thereof is disclosed in detail in the ensuing description and accompanying sheets of drawings, the figures of which are described below.

Figure 1:
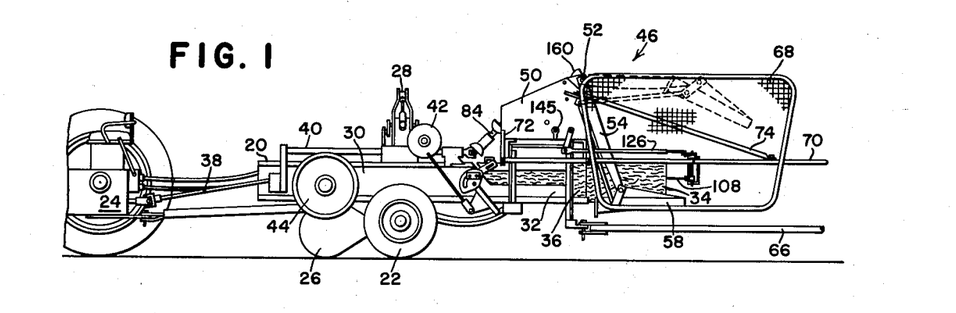
FIG. 1 is a side elevational view, on a reduced scale and with parts omitted, illustrating a typical thrower-equipped baler associated with other components of a conventional vehicular train.
Figure 2:
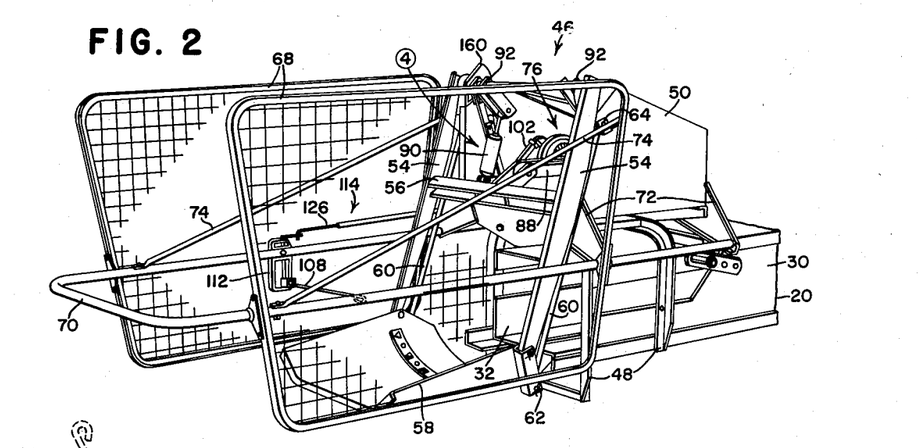
FIG. 2 is an enlarged perspective of the rear portion of the baler and associated thrower mechanism as seen from the rear and the side opposite that illustrated in FIG. 1.

The numeral 20 in FIG. 1 designates in its entirety a typical pickup baler carried by wheels 22 and drawn by a tractor 24 for advance over a field of previously harvested crops which are formed into windrows. The baler has a pickup mechanism 26 which operates to pick up the windrowed crops and to transfer them via feed mechanism 28 to a bale case 30 in which successive charges of material are compacted and formed into individual bales, by mechanism that is familiar to those versed in the art. In this case, the bale case 30 extends fore and aft or parallel to the direction of travel of the vehicular train and the rear end thereof serves as a discharge outlet 32 from which individual formed and tied bales emerge in succession, one such bale being shown as substantially fully emerged at 34 and a succeeding bale emerging at 36. The operating mechanism of the baler is driven in typical manner, as by a propeller shaft 38 connected to the tractor PTO. A power shaft 40 on the baler extends rearwardly to drive the feed mechanism 28 as well as the tying mechanism, represented generally by the numeral 42. The bales are compacted by the usual plunger (not shown), the flywheel for which is shown at 44.

The bale handling mechanism or thrower is designated in its entirety by the numeral 46 and is here of the type which is mounted directly on the rear of the bale case 30, as by means of a pair of arched supports 48 and an upper box-like supporting structure 50.

The structure 50 carries at a portion thereof at a level above the bale case outlet 32 a transverse rockshaft 52 which in turn has rigidly secured thereto a pair of transversely spaced apart depending arms 54, rigidly interconnected intermediate their ends by a crossbar 56 and pivotally carrying at their lower ends a receiver, here in the form of pan 58. Each arm has associated therewith a parallel link 60, pivoted at its lower end at 62 to the pan 58 and at its upper end at 64 to the associated side of the supporting structure 50. The parallel linkage thus established provides for movement of the receiver or pan 58 from a starting position, as shown in full lines in FIG. 1, to a discharge or unloading position, as illustrated in dotted lines in that figure. A complete cycle of operation will involve movement of the receiver from the starting position to its unloading position and back to its starting position.

The bale 34 in FIG. 1 is just about to be received by the pan 58, which also involves tripping of power-operated mechanism, to be subsequently described, and thereupon the pan 58 will be moved to its dotted line position. This movement is relatively rapid and, when the unloading position is attained, the deceleration is rather marked, with the result that the pan stops but the bale continues in a rearward, upward and downward trajectory, to be deposited into a trailing wagon or the like (not shown) conventionally trailed by the baler. In the present instance, the numeral 66 indicates a trailer or wagon tongue articulately connected to the baler to make up the remainder of the vehicular train comprising the tractor, baler and trailer.

From the foregoing description, it will be seen that the pan 58, as carried and controlled by the arms 54 and parallel links 60, moves in an upward and rearward arc from its starting or loading position to its discharge or unloading position, and return. Since considerable forces are involved, it is deemed expedient to provide at opposite sides of the mechanism protective screens or guards, such as those illustrated here at 68. These are carried in part by a U-shaped supporting element 70, the bight of which extends rearwardly across the area of the mechanism and the legs of which are carried, as by brackets 72 suitably affixed to the supporting structure 50. Brace rods 74 may be utilized to complete the supporting or protective structure thus afforded.

Figure 4:
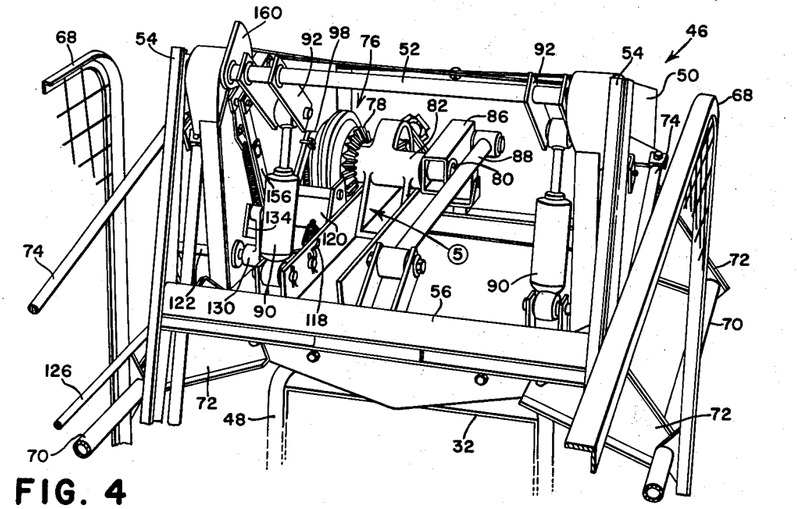
FIG. 4 is an enlarged perspective of that area of the mechanism illustrated by the arrow bearing the encircled numeral 4 in FIG. 2.
Figures 5, 6:
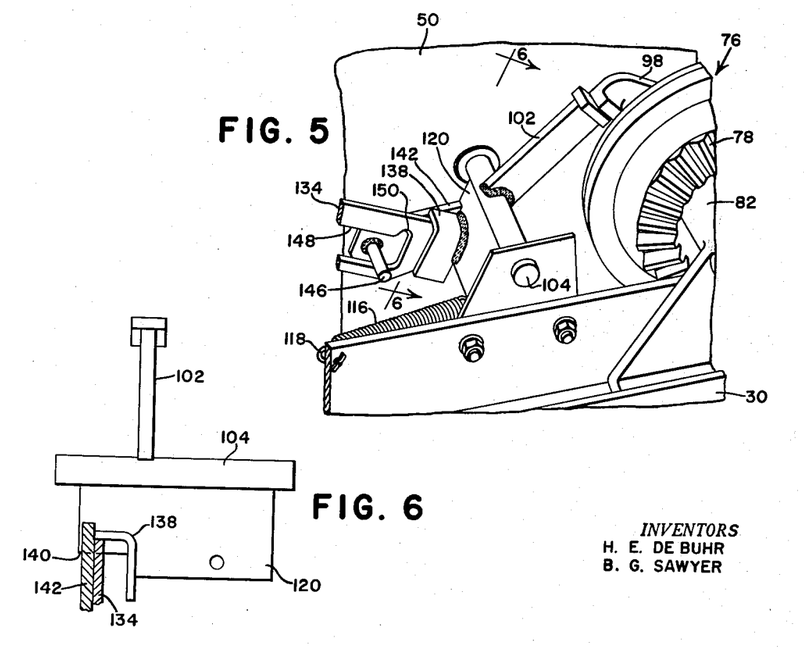
FIG. 5 is an enlarged perspective of that area of the mechanism bearing the encircled numeral 5 in FIG. 4.
FIG. 6 is an enlarged view, partly in section, as seen generally along the lines 6—6 of FIG. 5.

The power-operated mechanism for driving the thrower in the cycles already described is indicated in its entirety by the numeral 76 and includes a one-revolution clutch comprising a constantly rotating part 78 in the form of a bevel gear journaled on a transverse shaft 80 which constitutes an intermittently running part of the clutch. The shaft 80 may be journaled in any suitable bearing structure, as at 82, carried by the support means 50. This is best illustrated in FIGS. 4 and 5. The bevel gear 78 is driven from universally jointed shafting 84 which in turn is driven from the power shaft 40, previously described.

The shaft 80 is essentially a crank shaft, having rigidly secured at one end thereof a crank arm 86 which is connected by a pitman 88 to the thrower arms 54 via a connection to the previously described crossbar 56. The clutch is so designed and timed, relative to the throwing mechanism, that each time it is engaged it completes a single revolution during which the pan 58 is moved from its starting position to its unloading position and return. Because of the forces involved, snubbing means is provided, illustrated here as a pair of shock absorbers 90 connected between the support means 50 and arms 92 rigid on the thrower rock shaft 52.

The constantly rotating part 78 of the clutch is constructed in typical fashion and has internally thereof a driving lug 94. A hub 96 is keyed to the shaft 80 and pivotally carries a clutch pawl 98 having a roller 100 which is clear of the path of the lug 94 on the part 78 when the clutch is disengaged. A trip member 102, rockably carried on the support means 50 via a rockshaft 104, is biased to the position shown in FIG. 7 so that it engages the pawl 98 and holds it clear of engagement with the driving part lug 94. As is familiar to those versed in the art, when the trip member 102 is moved away from the pawl 98, the pawl moves, via a biasing spring 106, so that its roller 100 is engageable by the lug 94 on the part 78, whereupon the part 78 drives the shaft 80 and consequently the crank 86 and pitman 88. During substantially one-half of the revolution of the engaged or energized mechanism, the rotation of which is indicated by the arrow in FIG. 7, the pan 58 moves from the starting position as shown in full lines in FIG. 1 to the dotted line position of FIG. 1; and, during the remainder of the one revolution, the pan returns to its starting or full line position. This accordingly requires that the clutch be engaged and disengaged or energized and de-energized, which entails the use of automatic control mechanism, the basic principles of which are outlined in the Morrison patent referred to previously. The basic theory of operation is that while the pan 58 is in its starting position, the mechanism 76 is de-energized so that the throwing mechanism is stationary. As a bale emerges, such as the bale 34 in FIG. 1, it ultimately exits from the bale case outlet because it is being pushed rearwardly by the following bale, as at 36 in FIG. 1. At a predetermined point, which depends upon many considerations such as length of bale, etc., it is necessary that the clutch be engaged or energized so as to cause the pan 58 to travel through the previously described cycle, previous to which the bale 34 becomes deposited on the pan so that the bale is thrown rearwardly to the trailing vehicle. Involved in this cycle is means for causing energizing and de-energizing of the clutch 76, once for each throwing cycle.

Figures 7, 8:
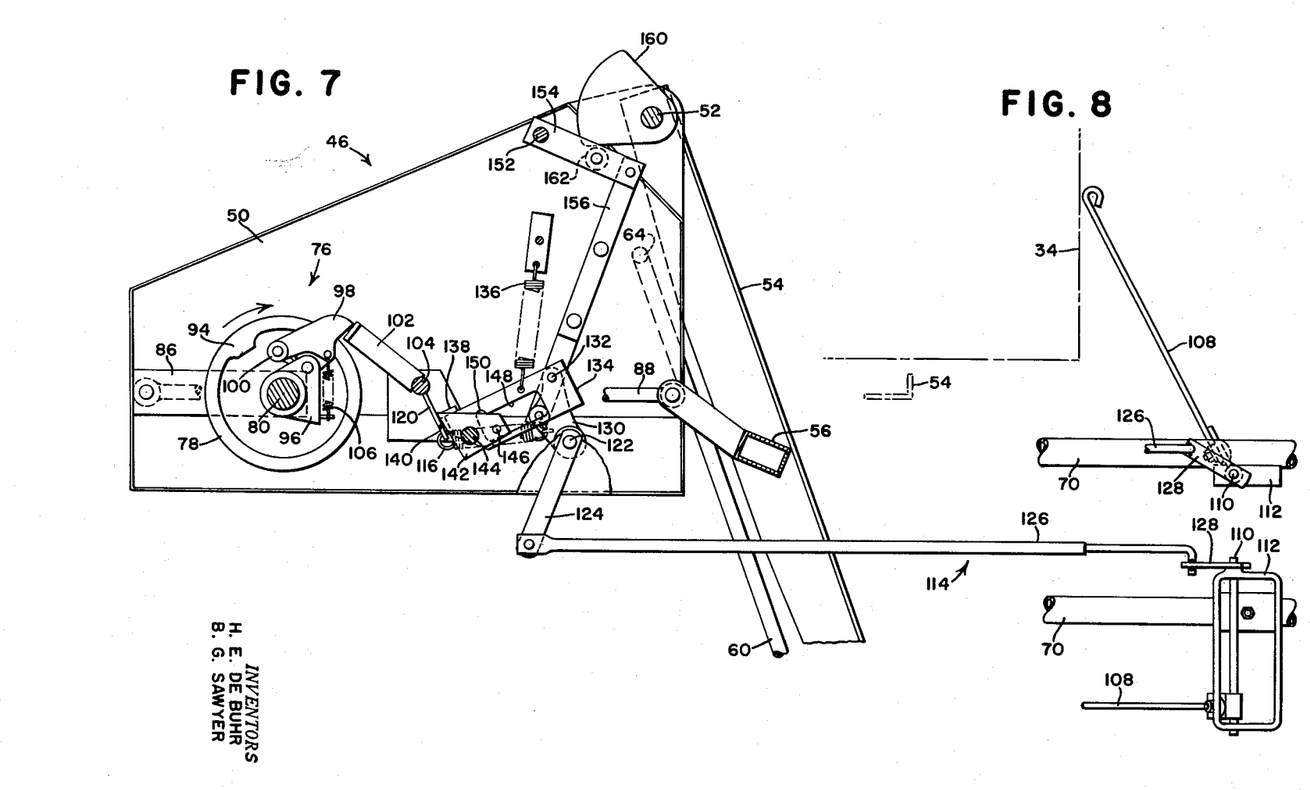
FIG. 7 is a fragmentary side elevation, partly in section and with portions omitted, illustrating the operating mechanism in its initial or starting position.
FIG. 8 is a fragmentary plan view illustrating the relationship between the feeler in its starting position and a bale in contact therewith.
Figures 9, 11:
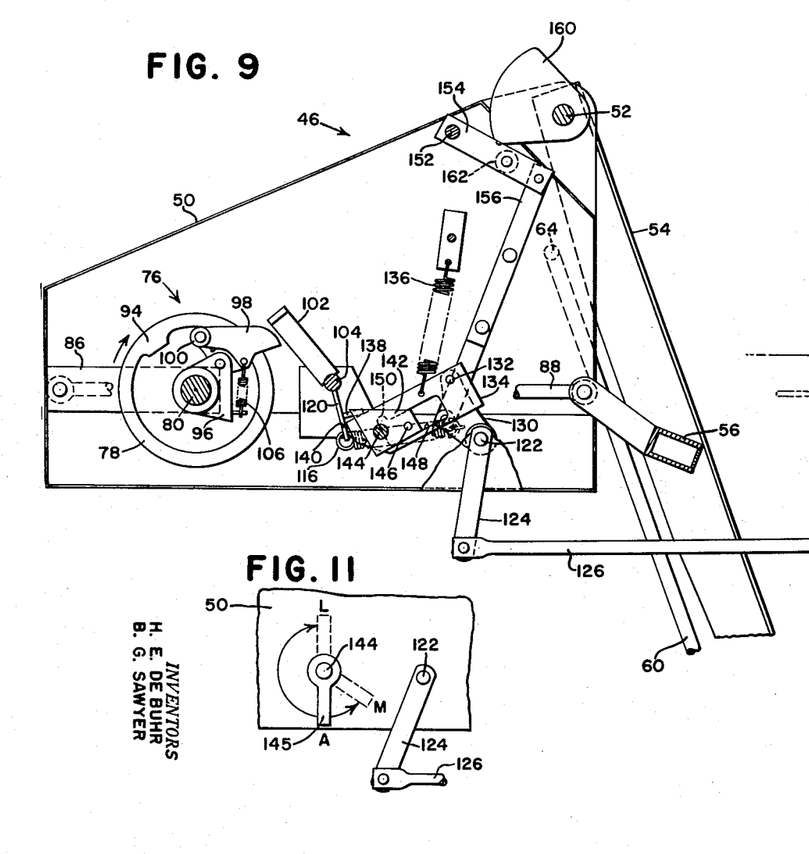
FIG. 9 is a view similar to FIG. 7 but illustrating the throwing mechanism just as the power-operated mechanism is tripped or energized.
FIG. 11 is a fragmentary elevation illustrating the selective control means and the three positions it may assume.
Figure 10:
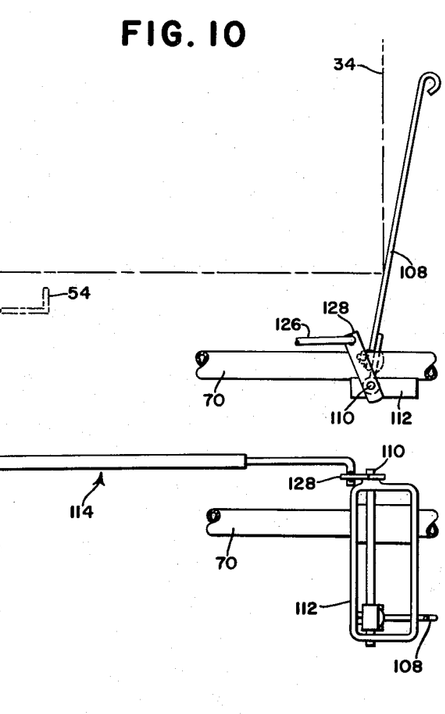
FIG. 10 is a view similar to FIG. 8 but illustrating the feeler after it has been moved by the emerging bale.

The means for triggering actuation of the clutch 76 here comprises a bale-sensing member or feeler 108, in this instance pivotally mounted on an upright shaft 110 journaled in a bracket 112 which is in turn rigidly affixed to the support structure, in this instance one of the legs of the support 70 for the protective structure 68, 68. As shown in FIG. 7, the feeler 108 normally projects into the path of the emerging bale, as at 34. When the bale moves rearwardly to the predetermined extent arrived at in the basic calculations for the design, it will displace the feeler rearwardly, as shown in FIGS. 9 and 10. The signal derived from this movement is transmitted to the clutch via force-transmitting means or linkage designated in its entirety by the numeral 114.

It will be seen from FIGS. 8 and 10 particularly that movement of the bale as carried by the pan 58 when the thrower is energized is in substance a continuation of the movement thereof as it emerges from the bale case. Hence, it is obvious that the bale 34, when so moved by the thrower, must brush the feeler 108 to one side. Also, as will be seen from these figures, the proximate thrower arm 54, in moving with the bale, will also pass the initial situs of the feeler. It will be clear from FIG. 1 that the arm 54 and associated link 60, as well as the pan 58, have a considerable range of movement, which means that the pan 58 will pass beyond the area of the feeler as it moves to its unloading or discharging position. Since the pan must return to its starting position, it must again pass the feeler. If the feeler is allowed to spring back after the mechanism passes it on its throwing stroke, it will be in the path of the mechanism on its return stroke, with likely damage to the feeler. According to the present invention, this disadvantage is eliminated by means for positively retracting the feeler and for keeping it in its retracted position until the mechanism returns to its starting position. The clutch 76 was previously described as being disengaged or de-energized while the receiver or pan 58 is in its starting position, and it was stated that this de-energizing or disengagement of the clutch was accomplished by the initial position of the trip arm 102, which is carried on the shaft 104 journaled in the support means 50. The initial position of the arm 102 (FIG. 7) is retained by a biasing spring 116, connected between the support means 50, as via an anchor 118 (FIG. 5) and an arm 120 in the form of a plate rigidly secured to the arm 102 by means of the shaft 104, the assembly of parts 102, 120 and 104 constituting a unitized element.

Part of the force-transmitting linkage 114 is made up of a transverse rock shaft 122 carried by a lower rear portion of the support means 50 on a transverse axis. This rockshaft has rigidly secured thereto, externally of the support means 50, a depending arm 124 which is connected in turn by a fore-and-aft extending link 126 to an arm 128 rigid on the feeler shaft 110. The rock shaft 122 has rigidly secured thereto, internally of the sides of the structure 50, a bell crank 130 which has one of its arms pivotally connected at 132 to a control member in the form of an apertured plate 134. The forward end of the plate 134 (left hand end to the reader) normally abuts a lower portion of the trip arm plate 120 so as to retain the trip arm 102 in the position of FIG. 7. A tension spring 136 biases the member 134 upwardly about its pivot 132, but the lower corner of plate 120 has at one side thereof an inverted L-shaped stop 138 which prevents the spring 136 from pulling the member 134 completely upwardly. For reasons to presently appear, the same corner of the plate 120 is notched or cut out at 140.

The combination of the two springs 116 and 136 keeps the parts in the positions thereof as shown in FIG. 7. That is to say, the spring 116 exerts a rearward force on the plate 120 of the trip arm 102, and this plate acts rearwardly against the member 134, to tend to turn the rock shaft 122 in a clockwise direction, thus drawing forwardly on the feeler control 126 and urging the feeler 108 in a counterclockwise direction, the forward position of which is stopped by engagement between the feeler and the supporting bracket 112. At the same time, the upward force exerted by the spring 136 on the member 134 tends to urge the feeler in the aforesaid direction. As previously stated, the L-shaped stop 138 prevents the member 134 from being separated in an upward direction from its engagement with the trip arm plate 120.

The relationship of the trip arm 102 to the remainder of the control means is further influenced by a selector member 142, here in the form of a four-sided trapezoidal plate carried on a control shaft 144 which is journaled in the same side of the structure 50 as is the rock shaft 122; that is, it is accessible at the left hand side of the baler, the expression "left hand" being used with reference to the position of an observer standing behind the machine and facing forwardly. The selector plate has three positions, which may be selected from externally of the structure 50 by means of an operating handle 145 (FIGS. 1 and 11). These three positions are designated A, L and M, for automatic, lockout and manual, respectively. For present purposes, the present position for automatic operation will be described, which is that involved in FIGS. 7 and 9.

In this posture of the member 142, its front edge or nose rests against the back of the trip arm plate 120 and lies outwardly to the left of and alongside the forward portion of the apertured plate 134 (FIG. 6). Thus, it is clear of the stop 138 and its nose is also above the notch 140 in the trip arm plate 120. Since the trip arm is substantially immobilized, by action of the springs as previously described, the selected position of the selector member or plate 142 will be retained. Although it may be desirable to detent or otherwise lock the selector member in its various positions, it is found that this is unnecessary in the automatic position. In the lock position, which will be described later, a releasable detent action is available. In the manual position, retention is not required, because of the manual operation. For the purpose of controlling the position of the apertured plate 134, the selector member has rigidly affixed thereto an inwardly projecting pin or stud 146 which extends through a substantially rectangular opening 148 in the member 134. One corner of the opening 148 terminates as a notch 150, the purpose of which will presently appear.

It will be seen from FIGS. 7 and 9 that the force-transmitting linkage is made up of the link 126, arm 124, bell crank 130 and plate or member 134, establishing a connection between the feeler 108 and the trip arm 102 so that when the feeler 108 is displaced from the position of FIG. 7 to that of FIG. 9, forces transmitted by the linkage 114 will cause the trip arm 102 to be rocked in a clockwise direction and thus clear of the pawl 98 of the clutch 76, whereupon the pawl spring 106 rocks the pawl to the position shown in FIG. 9 so that it can be engaged by the lug 94 on the constantly rotating part 78. This amounts to energizing of the power-operated mechanism so that the crank shaft 80 is turned in a clockwise direction, driving the thrower via the pitman 88 on its throwing and return stroke. The member 134 at this time acts in compression against the trip arm plate 120, from which it does not escape, because of the action of the spring 136 and the trip arm plate stop 138; that is to say, the member 134 cannot pass through the notch 140 in the trip arm plate 120. Considered without more, it will be seen that when the feeler 108 returns to its starting position (FIG. 7), the springs 116 and 136 will return the other members to their starting positions, in particular returning the trip arm 102 to its former position so that it intercepts the pawl 98 and causes it to become disengaged from the lug 94 on the driving part 78 whereupon disengagement occurs and the thrower mechanism remains in its initial or starting position until another cycle is started.

It was previously described that the feeler member 108 is in the path not only of the bale 34 as it is thrown but also that of the receiver itself. Accordingly, means is provided to retract the feeler 108 and to retain it in its retracted position until the starting position of the thrower mechanism is restored. It is a feature of the invention to utilize movement of the thrower as the source of power for the retracting means.

Figure 12:
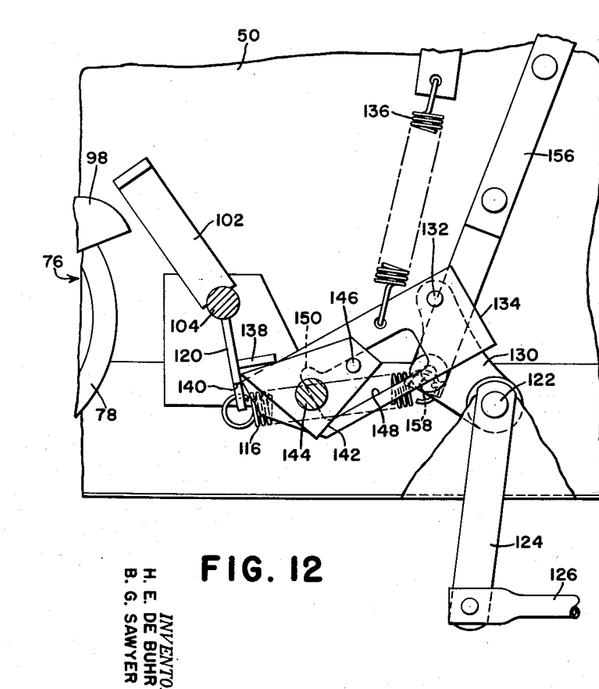
FIG. 12 is an enlarged fragmentary side elevational view of a portion of the mechanism shown in FIGS. 7 and 9, illustrating the same in a condition in which manual operation is effected.
Figure 13:
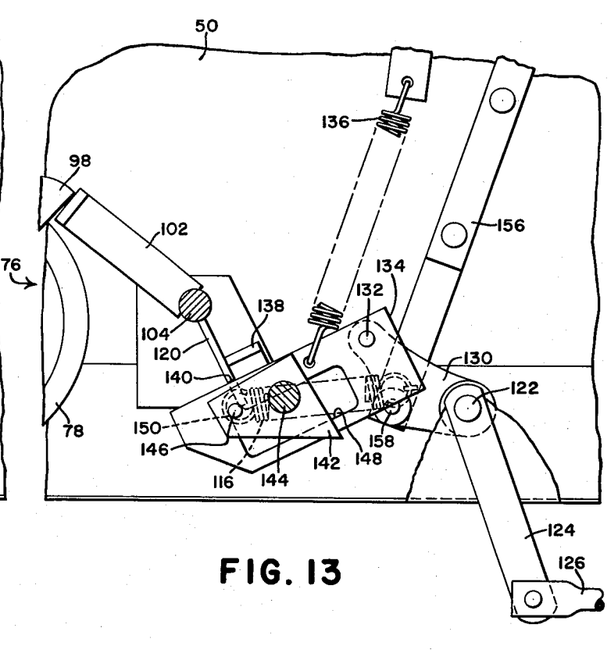
FIG. 13 is a similar view illustrating the condition in which the thrower mechanism is demobilized so as to permit the discharge of bales directly to the ground.

An upper part of the support structure 50 carries on a transverse pivot 152 an arm 154 which is connected at its opposite end by a link 156 to the other arm of the bell crank 130, the pivotal connection at that point being shown at 158 in FIGS. 12 and 13. A cam 160, rigid on the thrower rock shaft 52, is engageable with a roller 162 on the arm 154 when the thrower operates. When the thrower is idle, the cam is disengaged from the roller (FIGS. 7 and 9).

Figure 3:
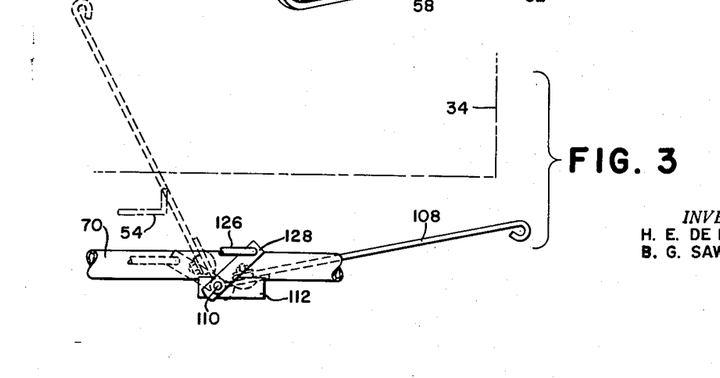
FIG. 3 is an enlarged view of a portion of the supporting structure and the feeler member illustrated in its retracted position in full lines and in its operative position in dotted lines.

As previously described, the feeler 108 is displaced a certain amount by the bale 34 as it emerges to take its position on the thrower pan 58. Compare FIGS. 8 and 10. This amount of movement is sufficient to trip the clutch 76 so that is becomes engaged (FIG. 9). The thrower arms 54 will then begin to swing upwardly and rearwardly and as this occurs cam 160 approaches the roller 162 on the arm 154, rocking the arm in a clockwise direction and driving the link 156 downwardly. The beginning of this phase is shown in FIG. 9. Since the link 156 is in effect a second input for the force-transmitting linkage 114, it follows that the linkage will cause the feeler 108 to retract to the position shown in full lines in FIG. 3, since downward movement of the link 156 causes counterclockwise rocking of the rock shaft 122 and this in turn exerts a rearward force through the link 126 to the feeler 108. Because of the length of the cam, the retracted position of the feeler is retained throughout the throwing stroke and throughout most of the return stroke. The cam is designed so that as soon as the receiver and associated parts pass forwardly of or below the feeler 108 on the return stroke of the receiver, the cam runs off the roller 162, and the spring 136, which of course acts on the bell crank 130 via its connection to the plate 134, returns the feeler to its initial position. As the cam 160 drives the linkage 156 downwardly, the plate 134 will pass below the trip arm plate 120 via the notch 140, but this is of no moment, since by the time that the thrower mechanism approaches its starting position on its return stroke the cam 160 will leave the roller 162 so that the spring action will return the parts to their starting positions whereby the trip arm 102 may intercept the pawl 98. So long as the feeler 108 is retracted (full lines in FIG. 3) it will be clear of the bale and receiver and will not be struck by the receiver on its return stroke. A stop action may be effected between the feeler 108 and the rear portion of the bracket 112 to prevent undesirable overtravel.

The foregoing description is based on automatic operation of the mechanism; that is, operation in which the thrower functions cyclically in response to the presence of a bale in the proper position. There are occasions when it is desired to cause actuation of the mechanism arbitrarily. For example, at the end of a run, a bale may be in the pan but not sufficiently rearwardly therein to cause actuation of the thrower mechanism. Since the baling operation is in effect discontinued, there will be no further bales following the bale 34 to cause it to move further rearwardly. At the same time, it may be desired to discharge the bale on the pan, rather than carry same thereon until the operation is resumed. Hence, the present invention provides manual means for tripping the mechanism so that the clutch will be engaged. This phase of the operation is shown in FIG. 12, which follows from turning the handle 145 counterclockwise to the manual or "M" position (FIG. 11).

When the handle 145 is turned, it of course turns the rockshaft 144 and the selector member 142 thereon, which means the selector is turned in a counterclockwise direction so that its nose presses against the trip arm plate 120, rocking the trip arm plate in a clockwise direction so as to clear the trip arm from the clutch pawl 98. In this position of the control means, the spring 136 will of course be pulling upwardly on member 134 but this in turn is stopped by the stop 138 on the trip arm plate 120. This substantially fixes the member 134 as a stop against which the pin 146 on the selector member abuts so that the maximum travel of the handle 145 to the "M" position is determined. At this time, neither the nose of the selector member 142 nor the front edge of the plate 134 passes the trip arm plate. Consequently, when manual pressure on the handle 145 is released, the biasing action of the spring 116, in returning the trip arm 102 to its position of FIG. 7, will return the handle 145 to its automatic or "A" position.

It is also possible, according to the invention, to set the control mechanism in a position in which it is locked out of automatic operation, in which case bales will emerge from the bale case and be discharged directly over the pan, since the pan will remain in its loading or starting position. Tied in with this feature is the automatic retraction of the feeler 108 so that it is not tripped each time a bale passes it. This position of the mechanism is indicated in FIG. 13 and represents the position that will be obtained by turning the handle 145 in a clockwise direction through 180° to the lock or "L" position.

If it be assumed that the change is made from automatic to lock positions, the 180° turn just described is effected, which represents a change in positions from FIG. 7 to FIG. 13. As the selector member 142 is rotated, the pin 146 thereon engages the bottom edge of the rectangular opening 148 in the plate 134, thus forcing the plate downwardly so that it passes the upper edge portion of the corner of the trip arm plate 120 in which the notch 140 is formed. This much of the action is of course against the tension in the spring 136. As the plate 142 continues to turn, it then engages the forward edge of the rectangular opening and pulls the plate or member 134 forwardly. This in turn causes a counterclockwise rocking of the bell crank 130 which in turn turns the rock shaft 122 in the same direction so as to force the link 126 rearwardly, thereby moving the ejector to its retracted position as shown in full lines in FIG. 3. In the final stages of turning of the member 142, the pin 146 passes upwardly along the front edge of the rectangular opening 148 and engages in the notch 150. As will be seen in FIG. 13, the line of force exerted by the spring 116 positions the trip arm plate 120 so that the notch 140 rides the top of the member 134, the spring 136 acting upwardly, of course, on this member. However, the spring 136 cannot pull the member 134 back to its original position because the member 134 is engaged with the notch 140 in the trip arm plate 120. Any rearward component of force acting on the member 134 is opposed by the interlock of pin 146 and notch 150. In short, the arrangement is such that the parts interlock with each other, keeping the trip arm 102 in position to retain the clutch pawl 98 in its disengaged position and at the same time to retain the feeler 108 in its retracted position. It will be clear that during this phase the thrower does not operate and therefore the cam 160 is inactive. The parts may be restored to automatic operation by returning the handle 145 to its automatic or "A" position.

In its automatic phase, the control mechanism is completely responsive to the emergence of bales successively to the pan 58 so that the cycle of operation of the thrower is repeated each time a bale is presented to it in throwing condition. The lockout and manual operational phases are added features, all of which contribute materially to a commercially successful mechanism.

Features and advantages other than those enumerated will readily occur to those skilled in the art, as will many modifications and alterations in the preferred embodiment disclosed, all of which may be achieved without departure from the spirit and scope of the invention.

What is claimed is:

1. A bale handler for use with a baler having an outlet from which bales emerge in succession along a rearward path, comprising: support means adjacent to the outlet; a transverse rockshaft rockable on the support means at a level above the outlet; a pair of transversely spaced arms fixed to and depending from the rockshaft in a starting position astride said path to enable entry of a bale therebetween; initially de-energized power-operated mechanism on the support means and connected to the arms and energizable to swing the arms rearwardly and upwardly to a bale-discharge position and back to said starting position; actuating means on the support means for energizing said mechanism and for de-energizing said mechanism upon return of the arms to their said starting position; receiver means on the arms for receiving a bale moving between the arms in their said starting position and operative to become disengaged from such bale when the arms attain their said discharge position for return to said starting position to receive a subsequent bale; a side part fixed to the support means laterally outwardly of one of the arms; a bale sensing member movably mounted on said side part and extending in an initial position inwardly over the receiver means and into the path of a bale moving between said arms to be engaged and displaced by the bale while said arms are in their starting position; force-transmitting means interconnecting said member and the aforesaid actuating means for causing said actuating means to energize the power-operated mechanism in response to bale-displacement of said member; retractor means connected to the force-transmitting means and driven by the rockshaft as the arms swing rearwardly and upwardly for retracting said member to a retracted position clear of both the bale and said receiver means, said retractor means including mechanism for keeping said member in said retracted position until said receiver means passes the member on its return to said starting position; and means for then returning said member to its initial position.

2. A bale handler for use with a baler having an outlet from which bales emerge in succession along a rearward path, comprising: support means adjacent to the outlet; arm means pivoted to the support means on a transverse axis at a level above said outlet and depending therefrom in a starting position adjacent to the outlet and alongside said path to enable movement of a bale past said arm means; initially de-energized power-operated mechanism on the support means and connected to the arm means and energizable to swing the arm means rearwardly and upwardly to a bale-discharge position and back to said starting position; actuating means on the support means for energizing said mechanism and for de-energizing said mechanism upon return of the arm means to their said starting position; receiver means on the arm means for receiving a bale moving past said arm means in said starting position and operative to become disengaged from such bale when the arm means attains said discharge position for return to said starting position to receive a subsequent bale; a side part fixed to the support means laterally outwardly of the arm means; a bale sensing member movably mounted on said side part and extending in an initial position inwardly over the receiver means; and into the path of a bale moving past said arm means to be engaged and displaced by the bale while said arm means is in said starting position; force-transmitting means inter-connecting said member and the aforesaid actuating means for causing said actuating means to energize the power-operated mechanism in response to bale-displacement of said member; retractor means connected to the force-transmitting means and driven by the arm means as said arm means swings rearwardly and upwardly for retracting said member to a retracted position clear of both the bale and said receiver means, said retractor means including mechanism for keeping said member in said retracted position until said receiver means passes the member on its return to said starting position; and means for then returning said member to its initial position.

3. The invention defined in claim 2, in which: the connection of the force-transmitting means between said member and the actuating means includes a releasable device for negativing action of the force-transmitting means on the actuating means; and manual means for releasing said device and for acting on the force-transmitting means to displace and retain the member clear of the receiver means and bale so that bales are movable rearwardly past the arm means while said arm means remains in its starting position.

4. The invention defined in claim 2, including: manual means operative independently of bale-displacement of said member for causing the actuating means to energize the power-operated mechanism.

5. The invention defined in claim 2, in which; the connection of the force-transmitting means between said member and the actuating means includes a releasable device for negativing action of the force-transmitting means on the actuating means; and tri-positionable manual selector means operative in one position to effectuate said force-transmitting means for automatic operation of the mechanism, operative in a second position for releasing said device and for acting on the force-transmitting means to displace and retain the member clear of the receiver means and bale so that bales are movable rearwardly past the arm means while said arm means remains in its starting position, and operative in a third position independently of bale-displacement of said member for causing the actuating means to energize the power-operated mechanism.

6. A bale handler for use with a baler having an outlet from which bales emerge in succession along a discharge path, comprising: support means; receiver means having a starting position adjacent to said outlet for receiving a bale and carried by the support means for movement to a discharge position to release the bale and returnable to said starting position to receive a subsequent bale; initially de-energized power-operated mechanism on the support means and connected to the receiver means and energizable to move said receiver means to said discharge position and back to said starting position; actuating means for energizing said mechanism and for subsequently de-energizing said mechanism upon return of the receiver means to said starting position; a bale sensing member movably carried by the support means and initially extending in traversing relation to the receiver means and into the path of a bale moving to the receiver means so as to be displaced by such bale while the receiver means is in its starting position; force-transmitting means interconnecting said member and the aforesaid actuating means for causing said actuating means to energize the power-operated mechanism in response to bale-displacement of said member; retractor means connected to the force-transmitting means and driven by movement of the receiver means toward its discharge positon for retracting said member to a retracted position clear of both the bale and said receiver means, said retractor means including mechanism for keeping said member in said retracted position until said receiver means passes said member on return thereof to said starting position; and means for then returning said member to its initial position.

7. The invention defined in claim 6 in which; the connection of the force-transmitting means between said member and the actuating means includes a releasable device for negativing action of the force-transmitting means on the actuating means; and manual means for releasing said device and for acting on the force-transmitting means to displace and retain the member clear of the receiver means and bale so that bales are movable rearwardly past the receiver means while said receiver means remains in its starting position.

8. The invention defined in claim 6, including: manual means operative independently of bale-displacement of said member for causing the actuating means to energize the power-operated mechanism.

9. The invention defined in claim 7 in which; the connection of the force-transmitting means between said member and the actuating means includes a releasable device for negativing action of the force-transmitting means on the actuating means; and tri-positionable manual selector means operative in one position to effectuate said force-transmitting means for automatic operation of the mechanism, operative in a second position for releasing said device and for acting on the force-transmitting means to displace and retain the member clear of the receiver means and bale so that bales are movable rearwardly past the receiver means while said receiver means remains in its starting position, and operative in a third position independently of a bale-displacement of said member for causing the actuating means to energize the power-operated mechanism.

10. The invention defined in claim 9, in which; the connection of the force-transmitting means between said member and the actuating means includes a releasable device for negativing action of the force-transmitting means on the actuating means so that bales are movable rearwardly past the receiver means while said receiver means remains in its starting position.

No references cited.